June 20, 1967 A. T. BASSETT, JR., ET AL 3,326,726
THERMOELECTRIC ARRAY AND METHOD OF MANUFACTURE
Filed March 22, 1963 3 Sheets-Sheet 1

INVENTORS
Arthur T. Bassett, Jr.
Richard S. Gaugler
BY
Carl A Stickel
Their Attorney June 20, 1967  A. T. BASSETT, JR., ET AL  3,326,726
THERMOELECTRIC ARRAY AND METHOD OF MANUFACTURE
Filed March 22, 1963  3 Sheets-Sheet 2

INVENTORS
Arthur T. Bassett, Jr.
Richard S. Gaugler
BY
Their Attorney

June 20, 1967 A. T. BASSETT, JR., ET AL 3,326,726
THERMOELECTRIC ARRAY AND METHOD OF MANUFACTURE
Filed March 22, 1963 3 Sheets-Sheet 3

INVENTORS
Arthur T. Bassett, Jr.
Richard S. Gaugler
BY Carl A. Stickel
Their Attorney

United States Patent Office 3,326,726
Patented June 20, 1967

3,326,726
THERMOELECTRIC ARRAY AND METHOD OF MANUFACTURE
Arthur T. Bassett, Jr., and Richard S. Gaugler, Dayton, Ohio, assignors to General Motors Corporation, Detroit, Mich., a corporation of Delaware
Filed Mar. 22, 1963, Ser. No. 267,270
10 Claims. (Cl. 136—203)

This invention pertains to refrigerating apparatus and more particularly to a thermoelectric array constructed to be protected from damage or breakage.

Thermoelectric materials are customarily soldered to copper connectors in an array. These thermoelectric materials and also the soldered junctions are inherently brittle, weak and subject to damage or breakage upon relatively light stresses.

It is an object of our invention to construct a thermoelectric array in such a way that the thermoelectric materials and the soldered junctions are protected from damage and breakage.

It is another object of our invention to construct a thermoelectric array in such a way that substantially all stresses are shared by substantially all the thermoelectric material and all soldered junctions.

It is another object of our invention to construct a thermoelectric array in such a way that substantially all stresses are carried by reinforced plastic insulating material provided for supporting the thermoelectric material.

It is another object of this invention to provide accurate, convenient means for locating the copper connecting straps which will eliminate need for locating fixtures.

It is another object of our invention to provide accurate, convenient means for locating copper connecting straps which will also provide a form for the filling of the space between the thermoelectric material with a heat and electrical insulating material, such as a plastic foam resin.

These and other objects are attained in the forms shown in the drawings in which copper connector straps, each having two cylindrical projections on one face, are either with or without the use of a locating fixture passed through the apertures in a reinforced, perforated plastic sheet. This may either be a press fit, or thin spring steel coupling washers may be fitted onto the projecting ends of the cylindrical sections of the copper connecting straps. A perforated thermoelectric holder is then fitted onto the previous assembly and a locating templet is placed over this perforated holder and N type thermoelectric elements having solder on the tops and bottoms are passed through the openings in the templet into each alternate opening in the perforated thermoelectric holder. The templet is then either turned over or removed, and another templet with apertures over the remaining perforations in the thermoelectric holder is substituted to assure the proper location of the P type thermoelectric elements, likewise solder coated on the top and bottom, which fill the remainder of the perforations. Thereafter, the templet is removed and the assembly is placed on an electric surface heater for heating the assembly to the melting point of the solder to join the thermoelectric materials to the cylindrical projections upon the copper connecting straps. After this soldering step, the perforated thermoelectric holder is removed.

A second set of copper straps, each with a cylindrical projection, either with or without the use of a locating fixture, has its cylindrical projections passed through a perforated, reinforced, plastic, rigid sheet until the cylindrical projections project a substantial distance on the opposite side of the plastic sheet. This may either be a press fit or thin spring steel coupling rings are applied over the projections of the strap with sufficient tightness to hold the connectors and the rigid plastic sheet connected together. Two terminal connectors are also riveted to the plastic sheet and also to the unconnected ends of two connector straps located at the opposite ends of the array. This second assembly is placed on an electric heater with the straps directly in contact with the heat transfer surface of the heater. The first mentioned assembly is inverted and placed on top of the last mentioned assembly with the solder faced thermoelectric ends directly in engagement with the cylindrical projections upon the copper connector straps. The heat from the electric heater melts the solder and joins the adjacent ends of the the thermoelectric materials and the copper connector straps. The spaces between the plastic sheets surrounding the cylindrical projections and the thermoelectric materials is filled with a suitable plastic resin foam, such as a polyurethane foam.

Further objects and advantages of the present invention will be apparent from the following description, reference being had to the accompanying drawings wherein preferred embodiments of the present invention are clearly shown.

Figure 1:
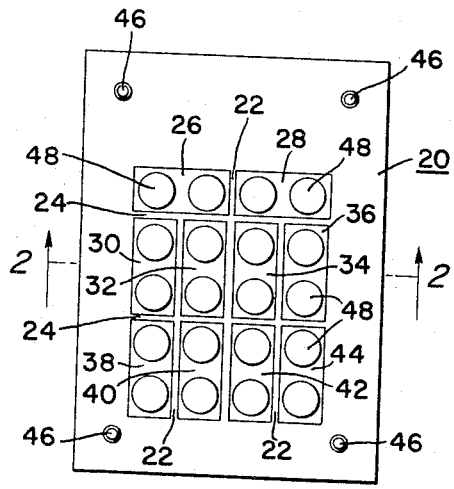
FIGURE 1 is a top view of the recessed face of the first templet containing ten connectors in the recesses thereof in a predetermined pattern.
Figure 5:
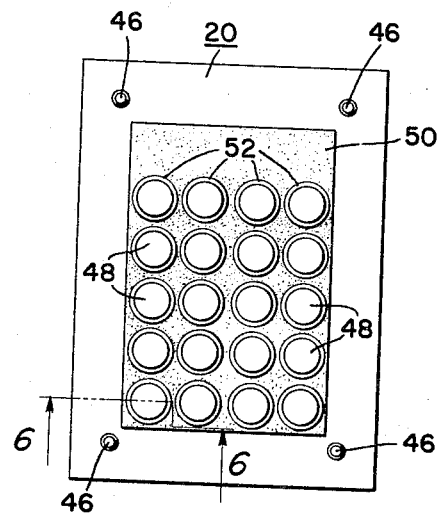
FIGURE 5 is a top view of the assembly similar to FIGURE 3 but with thin spring steel washers applied upon each of the protruding cylindrical projections to hold the copper straps assembled to the reinforced plastic sheet.
Figure 2:
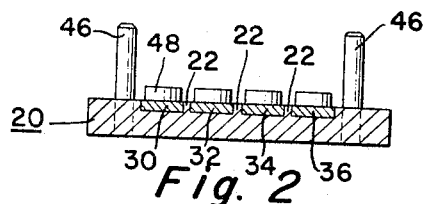
FIGURE 2 is a vertical, transverse, sectional view taken along the lines 2—2 of FIGURE 1 of the first templet and connectors.

Referring now to the drawings and more particularly to FIGURE 1, there is shown a rectangular templet 20 containing ten rectangular recesses spaced apart by three longitudinal ribs 22 and two transverse ribs 24 providing the arrangement of recesses including an upper layer of two transverse recesses and a middle and bottom layer of four longitudinal recesses. Arranged horizontally in the uppermost recesses are the copper connector straps 26 and 28 on opposite sides of the central longitudinal rib 22. Located in the second row of recesses and positioned thereby are the second row of four vertically positioned copper connector straps 30, 32, 34 and 36. In the third row, the recesses locate the four vertically positioned copper connector straps 38, 40, 42 and 44. All of the connector straps are provided with two cylindrical bosses 48, one in each half thereof projecting in the same direction. At the corners, the templet 20 is provided with four locating pins 46.

Figure 6:
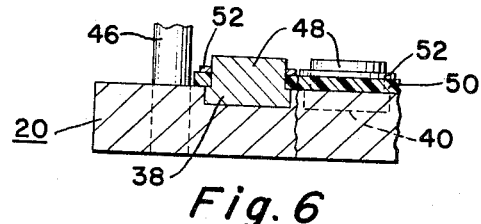
FIGURE 6 is a fragmentary, irregular, vertical, sectional view taken substantially along the line 6—6 of FIGURE 5.
Figure 3:
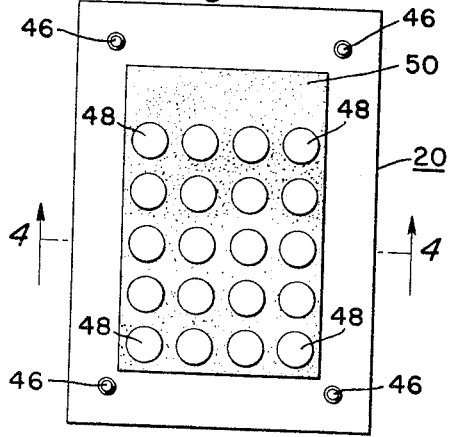
FIGURE 3 is a top view of the assembly after a perforated plastic sheet has been applied over the cylindrical projections of the copper straps.
Figure 7:
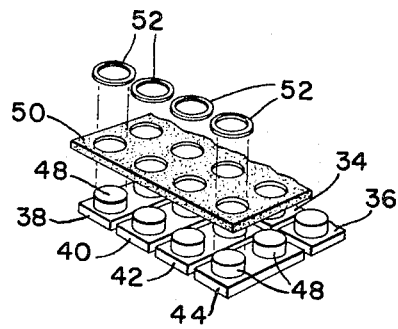
FIGURE 7 is an exploded perspective view illustrating the assembly of the copper straps and reinforced, perforated, plastic sheet and the thin spring steel rings without the use of a locating fixture.
Figure 4:
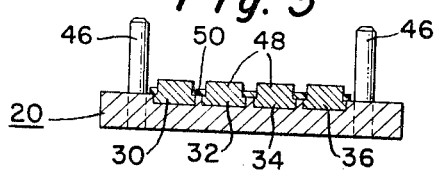
FIGURE 4 is a transverse, vertical, sectional view of the assembly shown in FIGURE 3.
Figure 8:
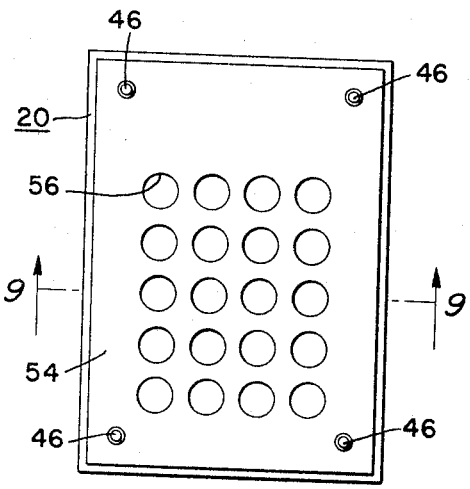
FIGURE 8 is a top view of the assembly with a thick metal plate having cylindrical perforations aligned with the cylindrical projections upon the copper straps viewed as in FIGURE 5.
Figure 9:
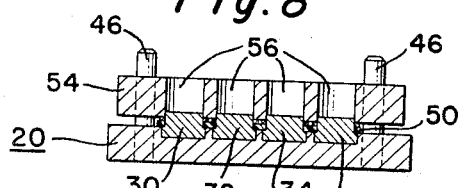
FIGURE 9 is a vertical, transverse, sectional view through the assembly shown in FIGURE 8 taken along the line 9—9 of FIGURE 8.
Figure 10:
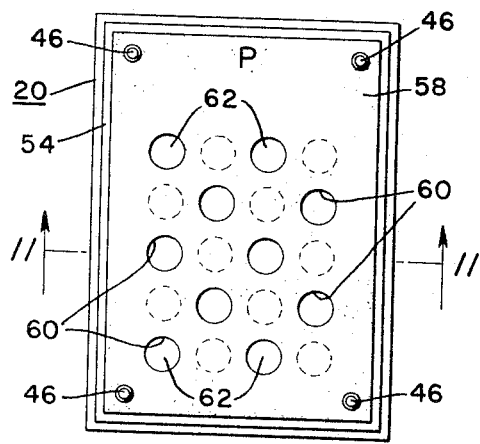
FIGURE 10 is a top view showing the second templet which is a perforated, reinforced, plastic sheet placed over the perforated, thermoelectric holder shown in FIGURE 8.
Figure 11:
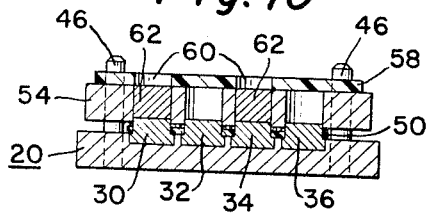
FIGURE 11 is a transverse, vertical, sectional view through the assembly shown in FIGURE 10 taken along the lines 11—11 thereof.
Figure 12:
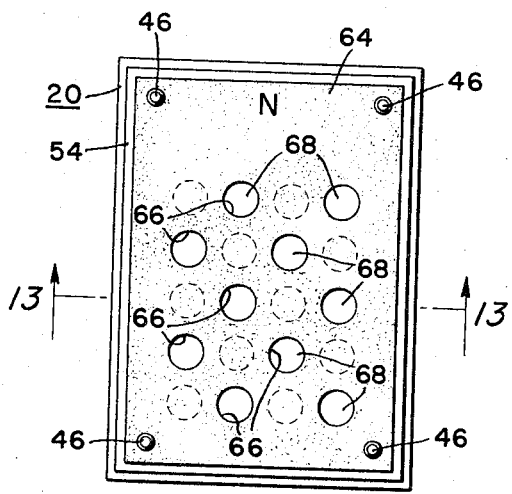
FIGURE 12 is a top view showing either the second templet inverted or a third templet resting upon the perforated thermoelectric holder shown in FIGURE 11.

Pressed onto the cylindrical bosses 48 is perforated, fiberglass reinforced melamine resin connector mounting plate 50. Preferably, the perforations of the plate 50 fit the cylindrical bosses 48 with a relatively tight press fit. The plate 50 fits under the bosses 48 as shown in FIGURE 4. If the press fit is not sufficient to hold the connector straps 26 to 44 inclusive in their proper places in the perforations of the plastic plate 50, there may be applied steel spring washers 52 which fit the cylindrical bosses 48 with sufficient tightness to hold the plastic plate 50 on the bosses 48 as shown best in FIGURE 6. The use of the templet 20 facilitates automatic production. However, where automatic production is not desired, the copper connector straps 26 to 44 inclusive may have their cylindrical bosses manually pushed through the apertures in the reinforced plastic plate 50 as indicated in FIGURE 7 and the steel spring washers 52 applied to the cylindrical bosses 48 on the opposite side of the plate 50 to hold the connector straps firmly connected to the plate 50 so as to provide a strong structural unit.

For the next step, there is applied over the four locating pins a second templet 54 of metal, such as aluminum, containing five rows of four cylindrical perforations 56. These perforations 56 are aligned with and fit over the cylindrical bosses 48 protruding through the perforations in the plastic plate 50. Thereafter, over the pins 46, there is placed a third (P) templet 58 of plastic having apertures 60 over the alternate apertures 56 of the second templet 54. These apertures 60 are located where the P type thermoelectric cylinders are to be introduced. These P type thermoelectric cylinders 62 are inserted through each of the apertures 60 and held in proper position by the apertures 56 in the templet 54 directly on top of the adjacent bosses 48 of the connectors. The P type templet 58 is then removed and an N type templet 64 of reinforced plastic is then placed on the four projections 46 and provides apertures 66 over the cylindrical bosses 48 in the remaining positions. The N type thermoelectric cylinders 68 which are tinned on the top and bottom are then slipped through each of the apertures 66 in the N type templet 64 on top of the cylindrical bosses 48. The N type templet 64 is then removed and the entire assembly is placed on the heater 70 and heated until the solder on the cylinders or on the cylindrical bosses 48 is heated to the melting point to cause the P and N type cylinders to be soldered to the bosses 48 of all the copper connector straps. If the locating templet 20 is not used, the copper connector straps may be placed directly on the heater 70 to accomplish the soldering operation.

Figure 15:
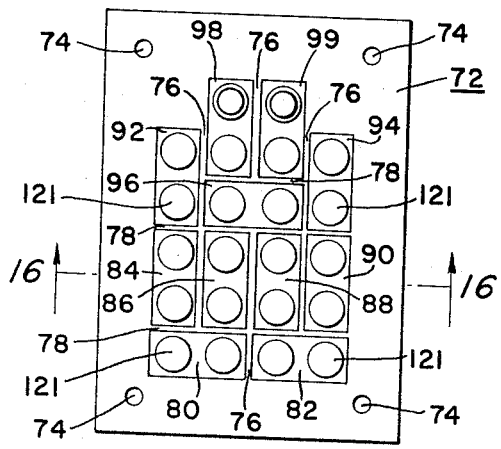
FIGURE 15 is a top view showing the second set of copper connector straps in a locating fixture.
Figure 19:
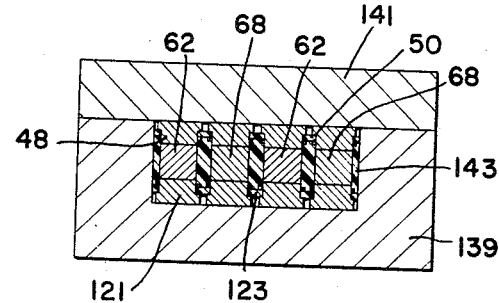
FIGURE 19 is a vertical, transverse, sectional view through the thermoelectric array and an enclosing mold for casting a plastic foam resin in between the two plastic sheets surrounding the thermoelectric elements.

In FIGURE 15, there is a fifth templet 72 having four apertures 74 which can be aligned with the four projections 46 extending from the first templet 20. The fifth templet 72 is provided with eleven recesses which are divided by the vertical ribs 76 and the horizontal ribs 78. Into these eleven recesses are provided eleven copper connector straps. The recesses locate in the lower row two horizontally positioned copper connector straps 80 and 82 which are separated by the vertical rib 76. The next row immediately above locates in four vertically positioned recesses the copper connector straps 84, 86, 88 and 90. Above these connector straps 84 to 90, there is provided an irregular array in which the recesses locate the connector straps 92 and 94 vertically, directly above the connector straps 84 and 90 while the connector strap 96 is positioned horizontally above the connector straps 86 and 88, separated by one of the ribs 78. Directly above the connector strap 96 are the vertically positioned connector straps 98 and 99 which project beyond the straps 92 and 94.

At the opposite ends of each of these copper connector straps 80 to 99, there is provided a cylindrical boss 121, all of which are equal in size. Onto each of the cylindrical bosses 121 is pressed a perforated, fiberglass reinforced, melamine connector mounting plate 123 having perforations tightly fitting the cylindrical projections 121 with a press fit. The plate 123 is pressed downward until it rests upon the copper connector straps 80 to 99 inclusive. To assure that the copper connector straps will not be removed from the plate 123, over the cylindrical bosses 121, there are placed thin steel spring washers 124 which fit the cylindrical projections 121 with sufficient tightness to hold the connector straps in place on the plate 123. An L-shaped terminal 125 is riveted by the rivet 127 to the mounting plate 123. Its extension is riveted at the point 129 to the upper portion of the copper connector strap 98. Instead of riveting, there may be used some other form of bonding, such as welding or soldering. A reversed L-shaped terminal member 131 is riveted by the rivet 133 to the mounting plate 123. The end portion of the terminal 131 is riveted or otherwise bonded at the point 135 to the upper portion of the copper connector strap 99. By this arrangement, stresses upon the terminals 125 and 131 are primarily transmitted through the rivets 127 and 133 to the mounting plate 123.

Figure 13:
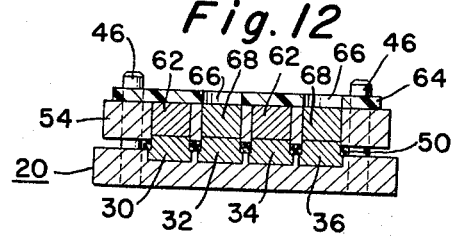
FIGURE 13 is a transverse, vertical, sectional view taken substantially along the lines 13—13 of FIGURE 12.
Figure 14:
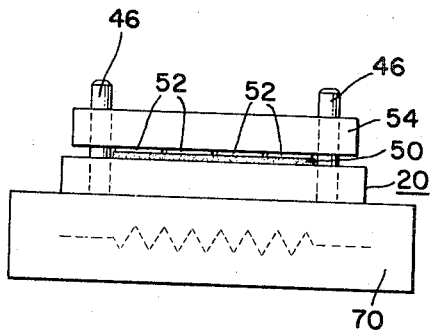
FIGURE 14 shows the assembly shown in FIGURES 12 and 13 with templet removed being heated upon an electric heater to solder the thermoelectric elements to the copper connector straps.
Figures 16, 17, 20:
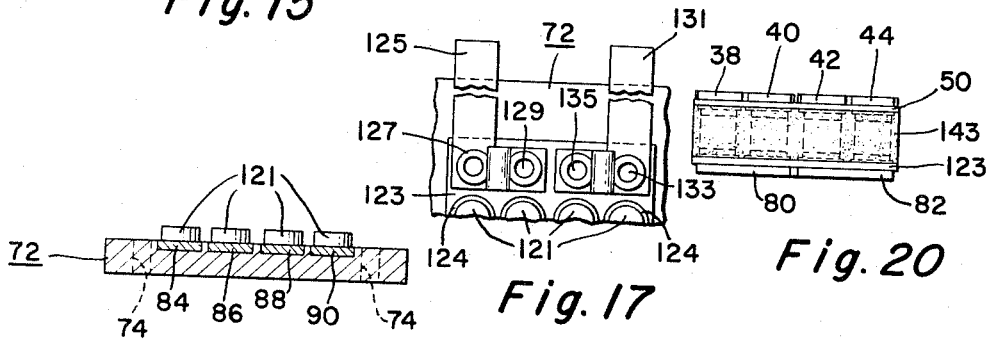
FIGURE 16 is a transverse, vertical sectional view taken along the lines 16—16 of FIGURE 15.
FIGURE 17 is a fragmentary, plan view showing the arrangement of riveting the terminals to the previously applied, reinforced, plastic sheet and to two copper connector straps.
FIGURE 20 is a view in elevation of the completed thermoelectric array.
Figure 18:
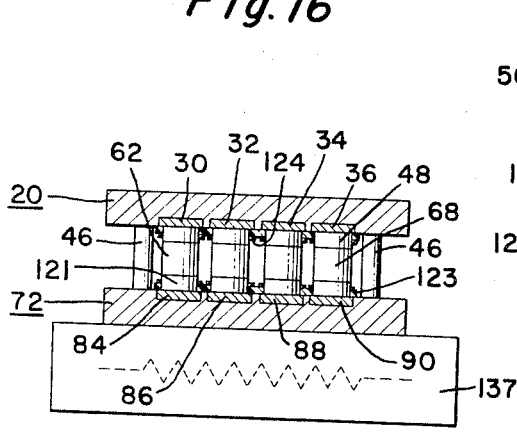
FIGURE 18 is a transverse, vertical, sectional view through the entire assembly with the inverted array of the first set of copper connector straps together with the soldered, thermoelectric cylinders resting upon the assembled second set of copper connector straps, all positioned upon a suitable electric heater for performing the remaining soldering operation.

Onto this assembly shown in FIGURE 17, there is placed the assembly shown in FIGURE 13 with templates 54 and 64 removed. The pins 46 engage the apertures 74 to insure proper alignment between the templets 20 and 72 and the mounting plates 50 and 123 and, particularly, provide the proper alignment between the cylindrical bosses 121 and the cylindrical thermoelectric elements 62 and 68. This assembly is then placed on an electric surface heater 137 and the assembly is heated until the solder provided upon the adjacent ends of the thermoelectric elements 62, 68 melts and forms a bond with the cylindrical projections 121. Following this, the top and bottom templets 20 and 72 are removed and the thermoelectric array is placed in a mold 139 and covered by a cover 141.

An electric insulating, foamed plastic resin 143 is then injected between the two plastic mounting plates 50 and 123 surrounding the cylindrical thermoelectric elements to maintain a heat barrier between the two sets of copper connecting straps and to assure that electrical insulation is maintained throughout the thermoelectric array. With this arrangement, all of the elements are connected in an electrical series circuit arrangement.

Figure 21:
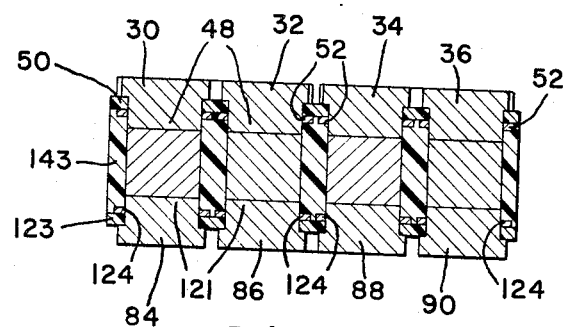
FIGURE 21 is an enlarged, vertical, cross sectional view of the completed thermoelectric array.

The completed thermoelectric array is shown in elevation in FIGURE 20 and in an enlarged section in FIGURE 21.

The P type thermoelectric elements, for example, may contain 50% bismuth telluride and 50% antimony telluride while the N type thermoelectric elements may contain about 90% bismuth telluride and 10% antimony telluride doped with between 0.25% and 0.3% copper bromide.

While the embodiments of the present invention, as herein disclosed, constitute preferred forms, it is to be understood that other forms might be adopted.

What is claimed is as follows:

1. A thermoelectric array including two spaced perforated sheet members of electrical insulating material, a plurality of connectors of electrical conducting material each having connecting portions extending on the outer faces of said sheet members and each having projecting portions extending from said connecting portions through separate perforations to the space between said sheet members to structurally connect the conectors to the sheet members to provide a strong structural unit, and N type and P type thermoelectric elements located in between said sheet members and extending between and bonded to the projecting portions of the connectors.

2. A thermoelectric array including two spaced perforated sheet members of electrical insulating material, a plurality of connectors of electrical conducting material each having connected portions extending on the outer faces of said sheet member and each having projecting portions extending from said connecting portions through separate perforations to the space between said sheet members to structurally connect the connectors to the sheet members to provide a strong structural unit, and N type and P type thermoelectric elements located in between said sheet members and extending between and bonded to the projecting portions of the connectors, and electrical terminals fastened to one of said sheet members electrically connected to different connectors.

3. A thermoelectric array including two spaced substantially parallel sheet members of electrical insulating material having a plurality of aligned apertures therein, a purality of short metal connectors having ends and each having connecting portions extending over the outer faces of each of said sheet members and each having adjacent each end a projecting portion extending through one of said apertures into the space between said sheet members to structurally connect the connectors to the sheet members to provid a strong structural unit, and N type thermoelectric elements located in between said sheet members and each extending between and bonded to the adjacent projecting portions at one end of each of the connectors, and P type thermoelectric elements located in between said sheet members and each extending between and bonded to the adjacent projecting portions at the opposite end of each of the connectors.

4. A thermoelectric array including two spaced subtantially parallel sheet members of electrical insulating material having a plurality of aligned apertures therein, a plurality of short metal connectors having ends and each having connecting portions extending over the outer faces of each of said sheet members and each having adjacent each end a projecting portion extending through one of said apertures into the space between said sheet members to structurally connect the connectors to the sheet members to provide a strong structural unit, and N type thermoelectric elements located in between said sheet members and each extending between and bonded to the adjacent projecting portions at one end of each of the connectors, and P type thermoelectric elements located in between said sheet members and each extending between and bonded to the adjacent projecting portions at the opposite end of each of the connectors, and separate electrical terminals fastened to one of said sheet members electrically connected to one of said connectors.

5. A thermoelectric array including two spaced substantially parallel sheet members of electrical insulating material having a plurality of aligned apertures therein, a plurality of short metal connectors having ends and each having connecting portions extending over the outer faces of each of said sheet members and each having adjacent each end a projecting portion extending through one of said apertures into the space between said sheet members to structurally connect the connectors to the sheet members to provide a strong structural unit, and N type thermoelectric elements located in between said sheet members and each extending between and bonded to the adjacent projecting portions at one end of each of the connectors, and P type thermoelectric elements located in between said sheet members and each extending between and bonded to the adjacent projecting portions at the opposite end of each of the connectors, and means for fastening each of said connectors to the adjacent sheet member.

6. A thermoelectric array including two spaced perforated sheet members of electrical insulating material, a plurality of connectors of electrical conducting material each having connecting portions extending on the outer faces of said sheet members and each having projecting portions extending from said connecting portions through separate perforations to the space between said sheet members to structurally connect the connectors to the sheet members to provide a strong structural unit, and N type and P type thermoelectric elements located in between said sheet members and extending between and bonded to the projecting portions of the connectors to structurally connect the connectors to the sheet members to provide a strong structural unit, and locking members applied to the portions of said projections between the sheet members for holding said connectors in the sheet members.

7. A thermoelectric array including two spaced perforated sheet members of electrical insulating material, a plurality of connectors of electrical conducting material each having connecting portions extending on the outer faces of said sheet members and each having projecting portions extending from said connecting portions through separate perforations to the space between said sheet members to structurally connect the connectors to the sheet members to provide a strong structural unit, and N type and P type thermoelectric elements located in between said sheet members and extending between and bonded to the projecting portions of the connectors, said plastic resin foam located in between the sheet members surrounding the thermoelectric elements.

8. A thermoelectric array including two spaced perforated sheet members of electric insulating material, a plurality of connectors of electrical conducting material each having connecting portions extending on the outer faces of said sheet members and each having projecting portions extending from said connecting portions through separate perforations to the space between said sheet members to structurally connect the connectors to the sheet members to provide a strong structural unit, N- and P-type thermoelectric elements located in between said sheet members and extending between and bonded to the projecting portions of the connectors, electrical terminals fastened to one of said sheet members electrically connected to different connectors, and electrical and heat insulating material extending in between and contacting said sheets and surrounding and contacting said thermoelectric elements.

9. The method of making a thermoelectric array which includes perforating two sheets of electric insulating material, providing a plurality of metal connectors each with two projections extending in the same direction, passing the two projections of each of a plurality of metal connectors through adjacent perforations in each of the sheets to locate and structurally connect the connectors to the sheets to provide strong structural units, and bonding N-type and P-type thermoelectric elements in between the projections of the connectors protruding through each of the sheets.

10. The method as defined in claim 9 including the additional step of casting an electrical insulating and heat insulating material between the two sheets of electrical insulating material surrounding the thermoelectric elements.

References Cited

UNITED STATES PATENTS

| | | | |
|---|---|---|---|
| 2,844,638 | 7/1958 | Lindenblad | 136—203 |
| 3,018,631 | 1/1962 | Bury et al. | 136—204 X |
| 3,040,539 | 6/1962 | Gaugler | 136—204 X |
| 3,070,644 | 12/1962 | VanderGrinten et al. | 136—230 |
| 3,197,844 | 8/1965 | Bassett | 136—201 X |

FOREIGN PATENTS

| | | |
|---|---|---|
| 912,001 | 12/1962 | Great Britain. |

WINSTON A. DOUGLAS, *Primary Examiner.*

ALLEN B. CURTIS, *Examiner.*